United States Patent

Wade

(10) Patent No.: US 8,869,104 B2
(45) Date of Patent: Oct. 21, 2014

(54) OBJECT CODE CONFIGURATION TOOL

(75) Inventor: Roy Wade, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 1836 days.

(21) Appl. No.: 10/881,663

(22) Filed: Jun. 30, 2004

(65) Prior Publication Data

US 2006/0005167 A1    Jan. 5, 2006

(51) Int. Cl.
*G06F 9/44* (2006.01)
*G06F 9/45* (2006.01)

(52) U.S. Cl.
USPC ........... 717/110; 717/111; 717/120; 717/140; 717/149

(58) Field of Classification Search
USPC .................................. 717/110, 136, 170, 140
See application file for complete search history.

(56) References Cited

U.S. PATENT DOCUMENTS

| | | | | |
|---|---|---|---|---|
| 5,604,905 A * | 2/1997 | Tevanian et al. | ............. | 717/140 |
| 5,960,198 A * | 9/1999 | Roediger et al. | ............. | 717/130 |
| 6,071,317 A * | 6/2000 | Nagel | ........................... | 717/128 |
| 6,078,967 A * | 6/2000 | Fulghum | .......................... | 710/2 |
| 6,502,176 B1 * | 12/2002 | Kobayashi et al. | ........... | 711/170 |
| 6,631,517 B1 * | 10/2003 | Lamping et al. | ............. | 717/151 |
| 6,643,842 B2 * | 11/2003 | Angel et al. | ................... | 717/130 |
| 6,865,735 B1 * | 3/2005 | Sirer et al. | ..................... | 717/158 |
| 6,880,149 B2 * | 4/2005 | Cronce | ......................... | 717/126 |
| 6,904,591 B2 * | 6/2005 | Grala | ............................ | 717/159 |
| 7,007,159 B2 * | 2/2006 | Wyatt | ................................ | 713/1 |
| 7,085,936 B1 * | 8/2006 | Moran | ............................... | 726/5 |
| 7,086,049 B2 * | 8/2006 | Goodman | ..................... | 717/168 |
| 7,162,710 B1 * | 1/2007 | Edwards et al. | ............... | 717/111 |
| 7,565,551 B2 * | 7/2009 | Kirovski | ........................ | 713/189 |
| 7,814,477 B2 * | 10/2010 | Sun et al. | ........................ | 717/173 |
| 7,895,580 B1 * | 2/2011 | Nikolov | .......................... | 717/130 |
| 2002/0049865 A1 * | 4/2002 | Charnell et al. | ............... | 709/315 |
| 2002/0066080 A1 * | 5/2002 | O'Dowd | ......................... | 717/128 |
| 2003/0188231 A1 * | 10/2003 | Cronce | ............................ | 714/52 |
| 2003/0204374 A1 * | 10/2003 | Madsen et al. | ................. | 702/186 |
| 2003/0212983 A1 * | 11/2003 | Tinker | ............................ | 717/110 |
| 2004/0236867 A1 * | 11/2004 | Lanus et al. | ................... | 709/238 |
| 2004/0237067 A1 * | 11/2004 | Sun et al. | ........................ | 717/110 |
| 2005/0028148 A1 * | 2/2005 | Civlin | ............................. | 717/145 |
| 2005/0050479 A1 * | 3/2005 | Bogdan et al. | ..................... | 716/1 |
| 2005/0240917 A1 * | 10/2005 | Wu | ................................ | 717/162 |

\* cited by examiner

*Primary Examiner* — Isaac Tecklu
(74) *Attorney, Agent, or Firm* — Duft Bornsen & Fettig LLP

(57) ABSTRACT

A system and method for managing several versions of a device with embedded object code by using an editor to scan the object code, find a signature, change one or more parameters within the object code, and replace the object code. The device may be shipped to a customer in a standard configuration and the object code may be changed by the customer using the editor.

33 Claims, 5 Drawing Sheets

OBJECT CODE CONFIGURATION TOOL

BACKGROUND OF THE INVENTION a. Field of the Invention

The present invention pertains generally to software configuration management and specifically to management of object code.

b. Description of the Background

Version management of various electronic products is a difficult task for manufacturers. Often, one product may be customized for several different customers. Each version of the product might be identical except for the firmware loaded into the device.

When several versions of the product are otherwise identical except for the firmware, several logistical problems exist for the manufacturer. Since each product is functionally different due to the different embedded program, separate testing algorithms must be developed and maintained for each version. Separate analysis and data tracking must be done for each test.

Additionally, inventory and warehousing must contend with several separate part numbers for a product that is otherwise mechanically identical. Such a situation causes a multiplication of costs. Further, when demand for a certain version exceeds inventory, other versions may be reconfigured, but only after unpackaging and reprogramming the devices already on the warehouse shelves.

It would therefore be advantageous to provide a system and method whereby devices with embedded object code may be assembled and tested using a single object code, yet shipped to various customers with differing configuration needs.

SUMMARY OF THE INVENTION

The present invention overcomes the disadvantages and limitations of previous solutions by providing a system and method for managing several versions of a device with embedded object code by placing a predefined table of variables in the object code, using an editor to scan the object code, find the table, change one or more parameters within the object code, and replace the object code. The device may be shipped to a customer in a standard configuration and the object code may be changed by the customer using the editor.

An embodiment of the present invention may include a software system comprising: an executable code comprising a predetermined signature, at least one optional routine, and an indicator to indicate if the optional routine is to be executed, the indicator being located in a predetermined location relative to the predetermined signature; and an editor adapted to scan the executable code for the signature, solicit an input, modify the indicator such that the optional routine may be executed to create a modified executable code, and replace the executable code with the modified executable code.

Another embodiment of the present invention may include a configuration management system comprising: a device having multiple configurations and comprising an executable code comprising a predetermined signature, at least one optional routine, and an indicator to indicate if the optional routine is to be executed, the indicator being located in a predetermined location relative to the predetermined signature; and an editor adapted to scan the executable code for the signature, solicit an input, modify the indicator such that the optional routine may be executed to create a modified executable code, and replace the executable code with the modified executable code.

Yet another embodiment of the present invention may include a method for changing the configuration of a device having executable code comprising: searching the executable code for a predetermined signature; finding an indicator at a predetermined location relative to the signature, the indicator indicating whether an optional routine should be run; changing the indicator so that the optional routine may be executed to create a new version of the executable code; replacing the new version of the executable code in the device; and executing the executable code.

The advantages of the present invention are that a manufacturer of devices with multiple configurations may manufacture, test, inventory, and ship a single configuration of a product to customers with different functional requirements. The manufacturer's costs and complexity are drastically reduced. Further, because only one version of firmware is shipped, that version may be more robust and more thoroughly tested than the alternative of maintaining different versions for each configuration.

DETAILED DESCRIPTION OF THE INVENTION

An executable program may be created with an embedded table of options that may be turned on and off, depending on the desired configuration of the program. In this manner, a single version of embedded program may be designed, tested, and shipped in a device, but the device may be subsequently customized for a particular customer's needs. An editor program is used to scan the executable program for a signature that locates option toggles or other variables that may be edited. The editor program may then recalculate checksums or other integrity mechanism and replace the original executable code with the edited executable code.

Figure 1:
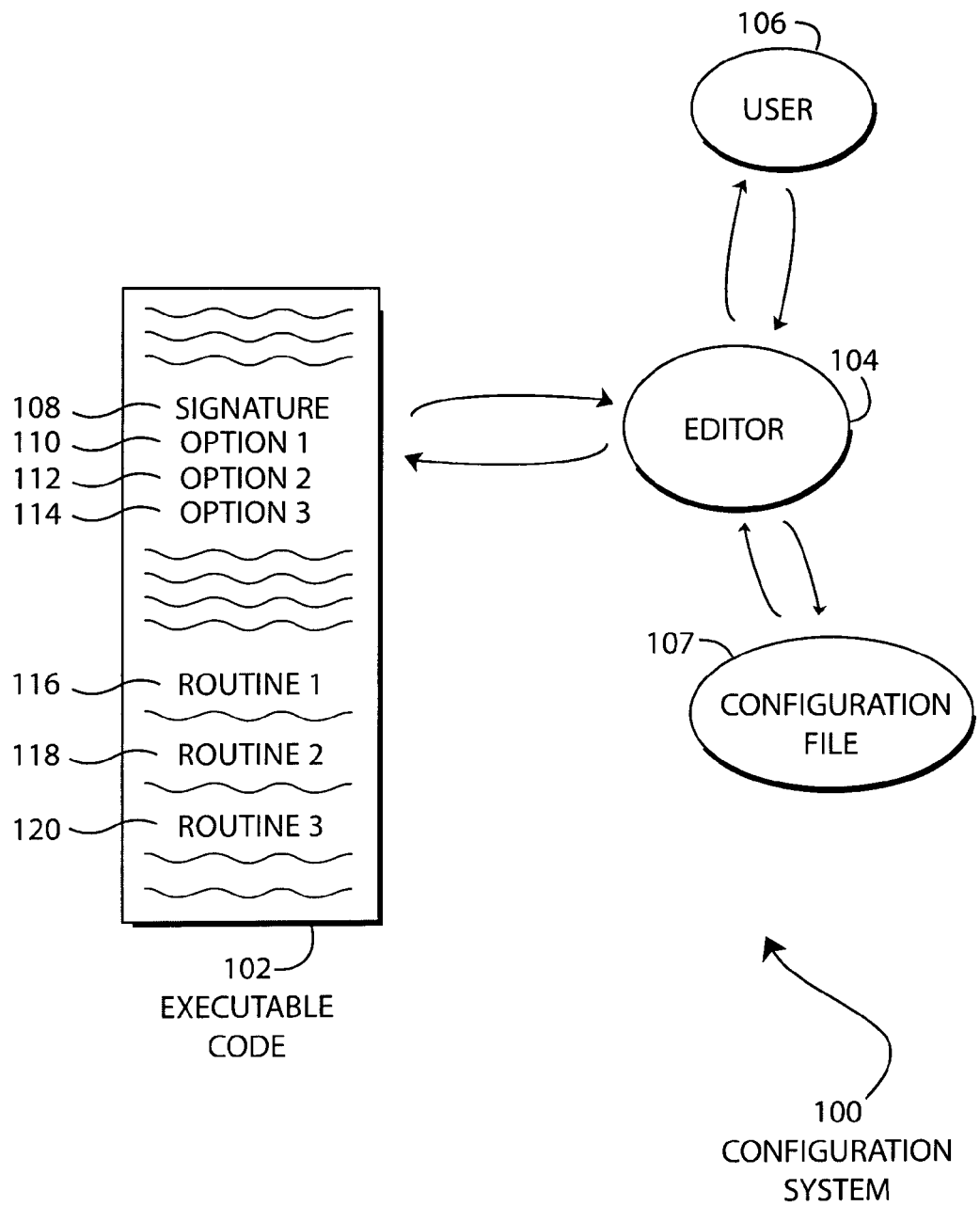
FIG. 1 is an illustration of an embodiment of the present invention showing a configuration system wherein executable code is edited directly with an editor.

FIG. 1 illustrates an embodiment 100 of the present invention showing a configuration system wherein executable code 102 is edited directly with an editor 104. The editor 104 may interact with a user 106 and a configuration file 107 to make appropriate changes to the executable code 102.

The executable code 102 may be a binary machine language, or other low level executable code. Generally, such code is not readily human readable. The executable code 102 may be executed by a microprocessor or other programmable device and stored in various memory devices known in the arts, such as an electronically erasable programmable read only memory.

A signature 108 may be embedded into the executable code along with several options 110, 112, and 114. When option 110 is enabled, the routine 116 may be available for execution. Similarly, options 112 and 114 may enable routines 118 and 120. The routines 116, 118, and 120 may perform functions that are options, additional features, or customizations for the particular application of the device in which the executable code 102 functions.

The signature 108 may be a particular sequence of 1's and 0's that may be used to identify the block of options 110, 112, and 114. The signature 108 is a predetermined sequence that may be selected such that it is not similar to other sequences contained within the executable code 102. The main purpose of the signature 108 is to enable the editor 104 to find the block of options 110, 112, and 114.

The block of options 110, 112, and 114 may be configured as individual bits of data that are set either on or off, or may be more complex data types. For example, if one of the options were to enable or disable a certain routine, a single bit or flag could be used. If one of the options set an integer number that is used by another routine, several bits may be used to encode such data. For example, if a specific number or other variable were to be used by the executable code 102, one of the options 110, 112, or 114 may be set to the integer value of that data or variable. Likewise, alphanumeric data or any other data structure may be contained in the options 110, 112, and 114. Each option 110, 112, or 114 may contain a series of data used to define an option. For example, option 110 may contain a bit for enabling a specific routine, plus numeric and alphanumeric data. The specific configuration and data structure is dependent on the specific application. Those skilled in the art will appreciate that any type of data in any form may be stored in the option 110, 112, or 114.

The signature 108 may be in the proximity of the options 110, 112, and 114 in the executable code 102. In some cases, the signature 108 may be located before, after, or in between the options 110, 112, and 114. The signature 108 may be used by the editor 104 to locate the options 110, 112, and 114. Once the signature 108 is located, the various options may be located a certain number of bits from the signature. While the current embodiment is merely exemplary, various embodiments may be created while keeping within the spirit and intention of the present invention.

The editor 104 may interface with a user 106 during the process of configuring the executable code 102. For example, the editor 104 may include a graphical user interface (GUI) that displays one or more options to select. The configuration file 107 may be used by the editor 104 to define the specific options available to the specific user. For example, if several options are available within the executable code 102, a subset of those options may be filtered using data in the configuration file 107, and only that subset may be displayed to the user 106.

In some cases, the editor 104 may not interface with the user 106 to determine the options to be enabled or disabled or variable settings to be changed within the executable code 102. Such settings may be contained in the configuration file 107 which could be read by the editor 104 without any human interaction.

Figure 2:
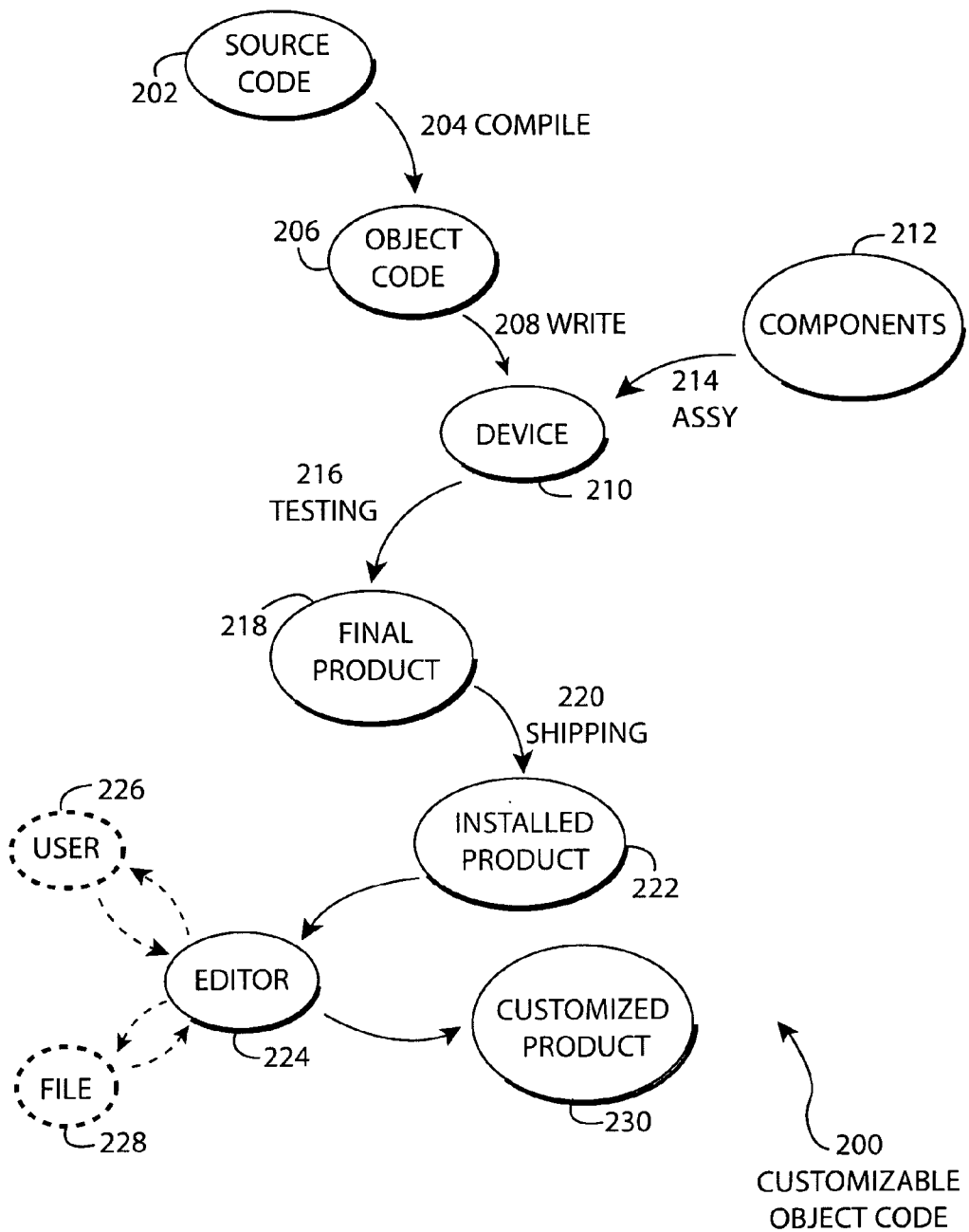
FIG. 2 is a workflow illustration of an embodiment of the present invention showing a process for customizing object code.

FIG. 2 illustrates an embodiment 200 of the present invention showing a process for customizing object code. Source code 202 is compiled 204 to create executable code or object code 206. The object code 206 is written 208 into a device 210 which is formed of components 212 that are assembled 214. The device 210 is tested 216 to produce a shippable final product 218. The product 218 is shipped 220 to the customer and installed as an installed product 222. The customer may use the editor 224 with an optional user interface 226 and other files 228 to product the customized product 230.

The source code 202 may be any type of human readable computer language, such as C, assembly language, FORTRAN, or other language. The source code 202 may be compiled 204 into object code 206. The object code 206 is generally a machine readable program that may be executed by a microprocessor or other programmable device. The object code 206 may contain one or more embedded data values such as flags, integer or real numbers, alphanumeric data, or other data that can be located and edited by the editor 224. The object code 206 may contain routines and functions that are used by all customized versions 230 of the device 210.

The installed product 222 may contain a generic set of functionality that allows the device to function in a standard configuration. After installation, the editor 224 may be used to change the functionality of the device by editing the object code 206 embedded therein. In other embodiments, the installed product 222 may not be functional until the editor 224 is invoked to configure the object code 206 to perform the appropriate tasks for the customized product 230.

The embodiment 200 illustrates a configuration management system where a single version of software, the object code 206, is shipped to customers. The customers use an editor 224 to modify only some small settings within the object code 206 to enable or disable certain functionality or configure some settings. In this manner, a single version of the object code 206 can be created, thoroughly tested, and shipped without having to build, test, and maintain custom versions of the object code 206 for each desired configuration. The end result is that the manufacture, testing, inventory, and delivery of the devices is streamlined without having the overhead of maintaining several customized part numbers.

Figure 3:
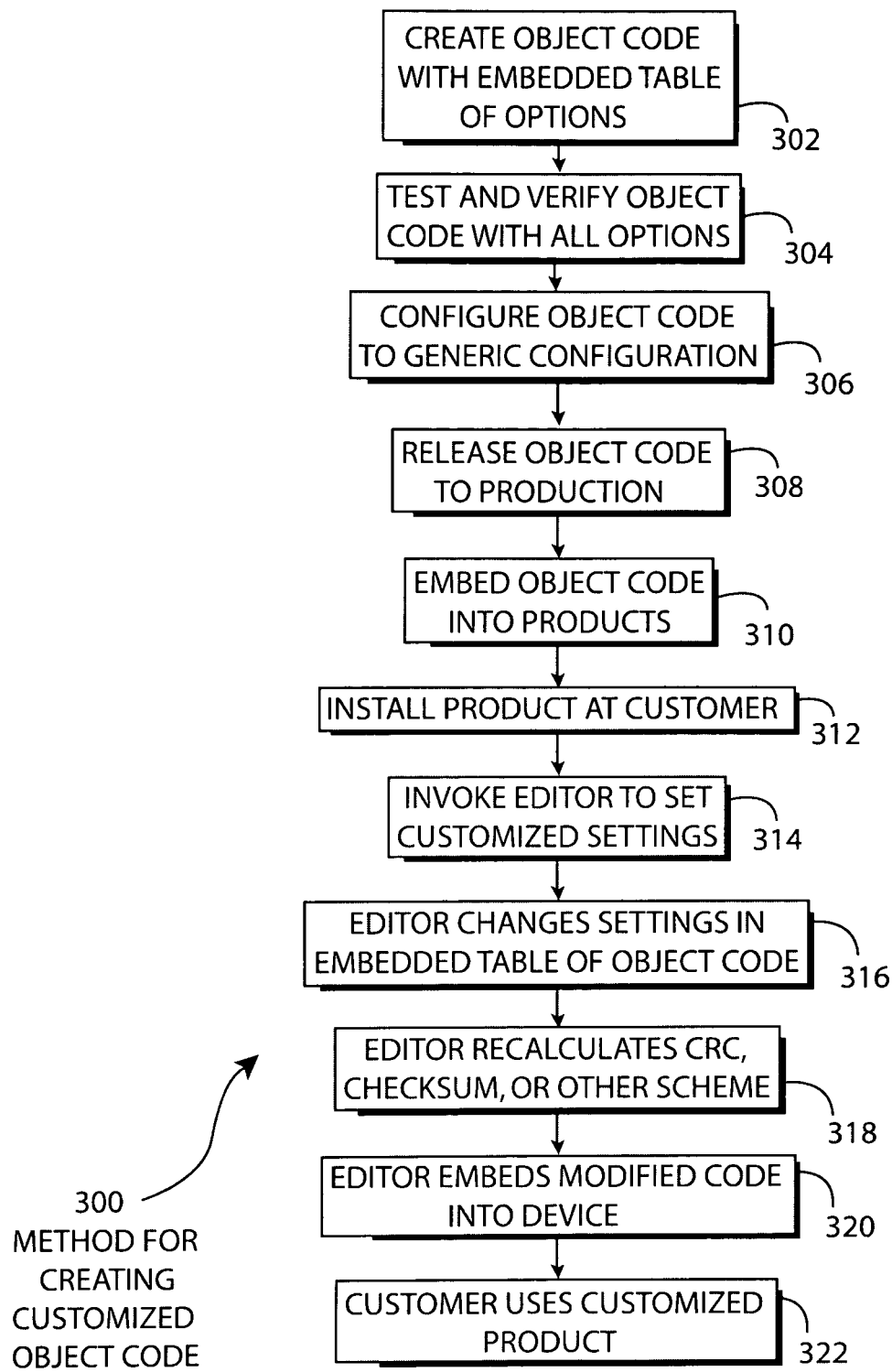
FIG. 3 is a flowchart illustration of an embodiment of the present invention showing a method for creating customized object code.

FIG. 3 illustrates an embodiment 300 of the present invention showing a method for creating customized object code. The object code is created with an embedded table of options in block 302. The object code is thoroughly tested and verified with all the options in block 304. The object code is configured into a generic configuration in block 306. The object code is released to production in block 308 and embedded into shippable products in block 310. The product is installed at the customer in block 312. After installation, the editor is invoked to set customized settings in block 314. The editor changes settings in the embedded table of the object code in block 316. The editor recalculates the checksums, cyclic redundancy checks (CRC), or other error checking or integrity mechanism in block 318 and embeds the modified object code in the device in block 320. The customer uses the customized product in block 322.

The code embedded into the device that is shipped to customers may contain all of the functionality for all customized versions the device. For example, there may be a special routine in the object code that is used by only one configuration of the device. That routine may be contained in every product that is shipped, even though the routine is not used by one or more versions of the product. Because only one version of software is applicable to all customers and all configurations, that version is simpler to build, test, and maintain for the manufacturer.

Figure 4:
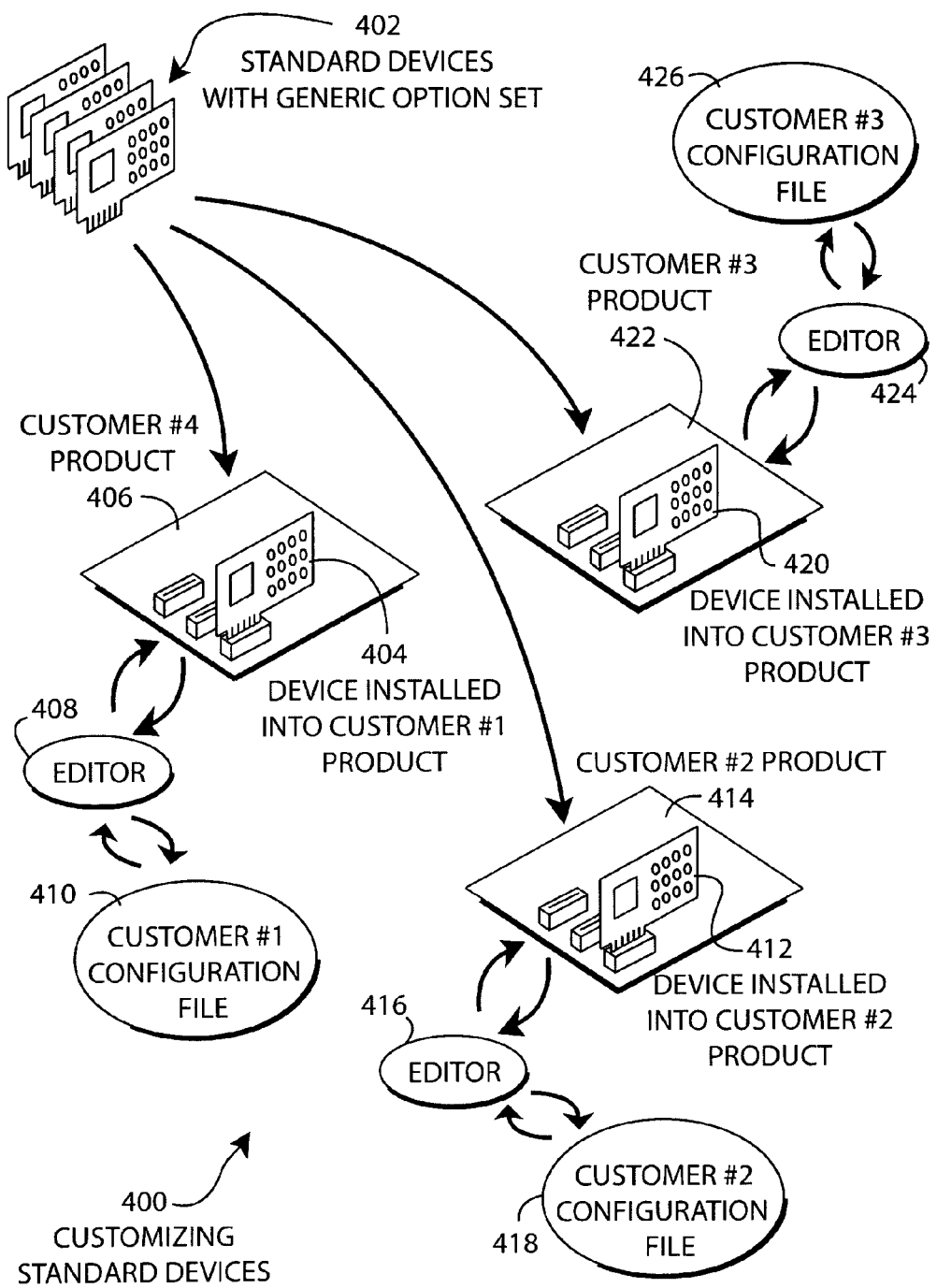
FIG. 4 is an illustration of an embodiment of the present invention showing a system for configuring standard devices.

FIG. 4 illustrates an embodiment 400 of the present invention showing a system for configuring standard devices. Standard devices with a generic option set 402 are shipped to several customers. A device 404 is installed to a first customer's product 406. The customer may use an editor 408 with the customer-specific configuration file 410 to set the specific settings for the device 404. Similarly, a device 412 is installed into a second customer's device 414. The second customer may use the editor 416 with a configuration file 418 customized for the second customer to modify the object code in the device 412. Likewise, a device 420 is installed into a third customer's device 422. The third customer may use the editor 424 with a configuration file 426 customized for the second customer to modify the object code in the device 420.

In embodiment 400, the editors 408, 416, and 424 may be identical software programs. The configuration files 410, 418, and 426 may be specific to each customer. The files 410, 418, and 426 may include parameters used by the editors to turn on or off or configure certain functionality available in the embedded object code of the devices 402. Each file 410, 418, and 426 may be tailored to that specific customer and may make certain options available to one customer without making such options available to another.

In some cases, two options available within the devices 402 may be incompatible, where if one option is turned on, another must be turned off. In some cases, a function may be specially requested by a customer and specially paid for by that customer. Even though that option is theoretically capable of being performed by devices shipped to other customers, the functionality would not be available unless the configuration file 410, 418, or 426 permitted that functionality to operate.

The configuration files 410, 418, and 426 may contain any type of data used to customize the editor. For example, settings of permitted choices, textual or graphical description of the choices, textual or graphical indicia such as logos or other customized enhancements to the editor, or any other data may be included. In some embodiments where the editor operates without a human interface, the configuration files 410, 418, and 426 may include just the appropriate settings for the device.

In some embodiments, the functions of the editor may be incorporated into other software systems or may be a stand alone application. In a case where the device 402 was a device embedded into a larger device, such as a disk controller installed into a motherboard of a computer, a configuration software system used for configuring the entire computer may include the functions of the editor and configuration file.

The devices 402 are illustrated as subsystems of a larger product. For example, the devices 402 may be a controller card used on a computer motherboard. In such an embodiment, the editor 408 may operate through the motherboard 406 to communicate with the device 404. In other embodiments, the devices 402 may be stand alone devices that are not dependent on other devices for communication with the editor 408.

Figure 5:
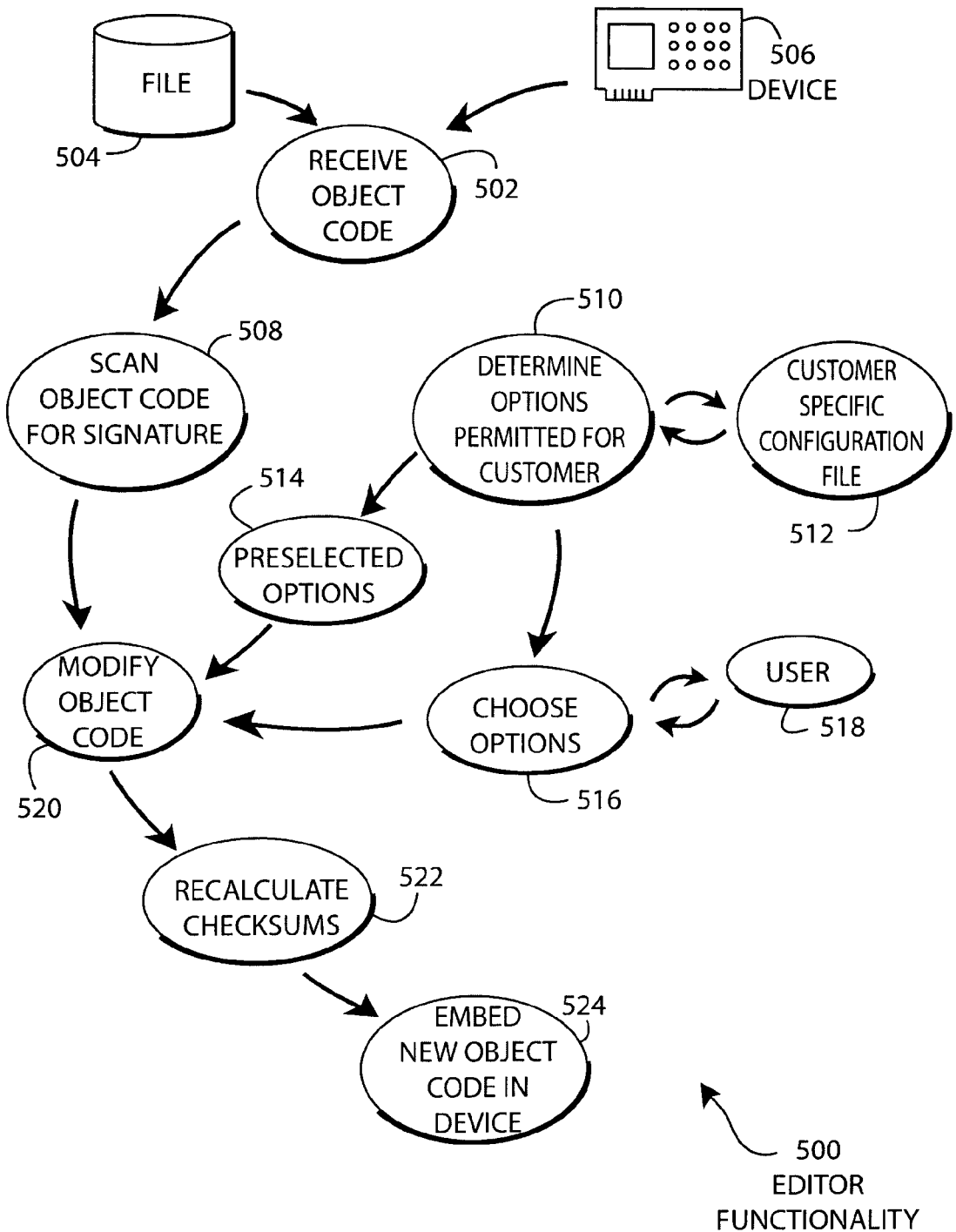
FIG. 5 is a workflow illustration of an embodiment of an editor used to configure a device with embedded object code.

FIG. 5 illustrates an embodiment 500 of an editor used to configure a device with embedded object code. The object code is received by the editor 502 from either a file 504 or by reading the object code from the device 506. The object code is scanned for the signature 508. The options permitted for the customer are determined 510 by evaluating a customer specific configuration file 512. Certain preselected options may be chosen 514 or the editor may allow a user 518 to choose options manually 516. In some case, both preselected options 514 and user selected options 516 may be used to modify the object code 520. Any checksums, CRC's, or other error detection or integrity mechanisms are recalculated 522 and the new object code is embedded in the device 524.

The editor may use a separate file 504 as a source for the object code 502, while in other cases, the object code may be read directly from the device itself 506. In either event, the machine readable code is used by the editor to set the configuration of the device. Because the object code is used by the editor and the object code is only machine readable, it is very difficult for a hacker or unauthorized personnel to determine where the proper settings are for specific functions. In the present embodiment, the only code available for modification is the machine readable code and not human readable source code. Thus, the only mechanism available for changing the object code is the editor and the associated configuration files.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A non-transitory software system comprising:
   executable object code compiled from source code, the compiled executable object code comprising a predetermined signature, at least one optional routine, and an indicator to control whether said optional routine will be executed in the future, said indicator being located in a predetermined location relative to said predetermined signature, said compiled executable object code being stored in a first computer readable storage medium, said indicator being configured such that said optional routine will not be executed; and
   an editor adapted to scan said executable code for said signature, solicit an input, modify said indicator such that said optional routine will be executed to create a modified compiled executable object code, and replace said compiled executable object code with said modified compiled executable object code,
   wherein the editor is further adapted to read a configuration file that describes whether an indicator is available for modification.

2. The software system of claim 1 wherein said compiled executable object code is compiled from source code in a human readable computer language.

3. The software system of claim 1 wherein said first computer readable storage medium is a programmable read only memory.

4. The software system of claim 1 wherein said editor is further adapted to solicit an input using a graphical user interface.

5. The software system of claim 1 wherein said editor is further adapted to solicit an input by reading a file.

6. The software system of claim 1 wherein the configuration file describes whether the compiled executable object code is available for modification.

7. The software system of claim 1 wherein said editor is further adapted to read said compiled executable object code from a device and write said modified compiled executable object code to said device.

8. The software system of claim 1 wherein said editor is further adapted to read said compiled executable object code from a file and write said modified compiled executable object code to said device.

9. The software system of claim 1 wherein said editor is further adapted to recalculate an integrity mechanism.

10. The software system of claim 9 wherein said integrity mechanism comprises a checksum.

11. The software system of claim 9 wherein said integrity mechanism comprises a cyclic redundancy check.

12. A configuration management system comprising:
   a device having multiple configurations and comprising compiled executable object code comprising a predetermined signature, at least one optional routine, and an indicator to control whether said optional routine will be executed in the future, said indicator being located in a predetermined location relative to said predetermined signature; and an editor adapted to scan said compiled executable object code for said signature, solicit an input, modify said indicator such that said optional routine will be executed to create a modified compiled executable object code, and replace said compiled executable object code with said modified compiled executable object code, wherein the editor is further adapted to read a configuration file that describes whether an indicator is available for modification.

13. The system of claim 12 wherein said compiled executable object code is compiled from source code in a human readable computer language.

14. The system of claim 12 wherein said compiled executable object code is stored in a programmable read only memory.

15. The system of claim 12 wherein said editor is further adapted to solicit an input using a graphical user interface.

16. The system of claim 12 wherein said editor is further adapted to solicit an input by reading a file.

17. The system of claim 12 wherein:
the configuration file describes whether the compiled executable object code is available for modification.

18. The system of claim 12 wherein said editor is further adapted to read said compiled executable object code from a device and write said modified compiled executable object code to said device.

19. The system of claim 12 wherein said editor is further adapted to read said compiled executable object code from a file and write said modified compiled executable object code to said device.

20. The system of claim 12 wherein said editor is further adapted to recalculate an integrity mechanism.

21. The system of claim 20 wherein said integrity mechanism comprises a checksum.

22. The system of claim 20 wherein said integrity mechanism comprises a cyclic redundancy check.

23. A method for changing the configuration of a device having compiled executable object code comprising:

searching said compiled executable object code for a predetermined signature, said compiled executable object code comprising an optional routine;

finding an indicator at a predetermined location relative to said signature, said indicator controlling whether an optional routine will be run in the future;

changing said indicator so that said optional routine will be executed to create a new version of said compiled executable object code;

replacing said new version of said executable code in said device; and executing said executable code, wherein the method further comprises reading a configuration file that describes whether an indicator is available for modification.

24. The method of claim 23 wherein said compiled executable object code is compiled from source code in a human readable computer language.

25. The method of claim 23 wherein said compiled executable object code is stored in a programmable read only memory.

26. The method of claim 23 further comprising soliciting an input using a graphical user interface.

27. The method of claim 23 further comprising soliciting an input by reading a file.

28. The method of claim 23 wherein:
the configuration file describes whether the compiled executable object code is available for modification.

29. The method of claim 23 further comprising: reading said compiled executable object code from a device; and writing said modified compiled executable object code to said device.

30. The method of claim 23 further comprising: reading said compiled executable object code from a file; and writing said modified compiled executable object code to said device.

31. The method of claim 23 further comprising recalculating an integrity mechanism.

32. The method of claim 31 wherein said integrity mechanism comprises a checksum.

33. The method of claim 31 wherein said integrity mechanism comprises a cyclic redundancy check.

* * * * *